Oct. 17, 1933.  R. F. KOHR  1,930,718
BRAKE SHOE
Original Filed Jan. 16, 1928

INVENTOR
ROBERT F. KOHR
BY
*R. M. Pomeroy*
ATTORNEY

Patented Oct. 17, 1933

1,930,718

UNITED STATES PATENT OFFICE 1,930,718

BRAKE SHOE

Robert F. Kohr, South Bend, Ind., assignor, by mesne assignments, to Bendix Aviation Corporation, South Bend, Ind., a corporation of Delaware Original application January 16, 1928, Serial No. 247,225. Divided and this application October 6, 1928. Serial No. 310,737

16 Claims. (Cl. 188—250)

This invention relates to brake shoes, particularly to shoes for brakes of the internal expanding type, and is a division of my co-pending application, Serial No. 247,225, filed January 16, 1928.

One of the objects of this invention is to provide a pressed metal brake shoe which is rigid in construction, light in weight and very economical to manufacture.

A further object is to provide a pressed metal brake shoe with an arcuate angle-shaped member having an axial lining supporting portion and a radial reinforcing web, and an arcuate plate secured to the angle member flush with the axial surface thereof to provide an additional lining supporting portion.

A still further object is to provide a brake shoe with an arcuate axial band and an arcuate angle member having an offset in its axial face whereby a portion of the axial band may be received in and secured to the offset portion of the angle member so that the axial band and axial portion of the angle member provide surfaces for supporting the brake shoe friction facing.

These being among the objects of the present invention the same consists of certain features of construction and combinations of parts to be hereinafter described with reference to the accompanying drawing, and then claimed, having the above and other objects in view.

In the drawing which illustrates a suitable embodiment of the present invention, Figure 1 is a section taken just inside the head of the brake drum to show the brake shoes and operating means in elevation.

Figure 1:
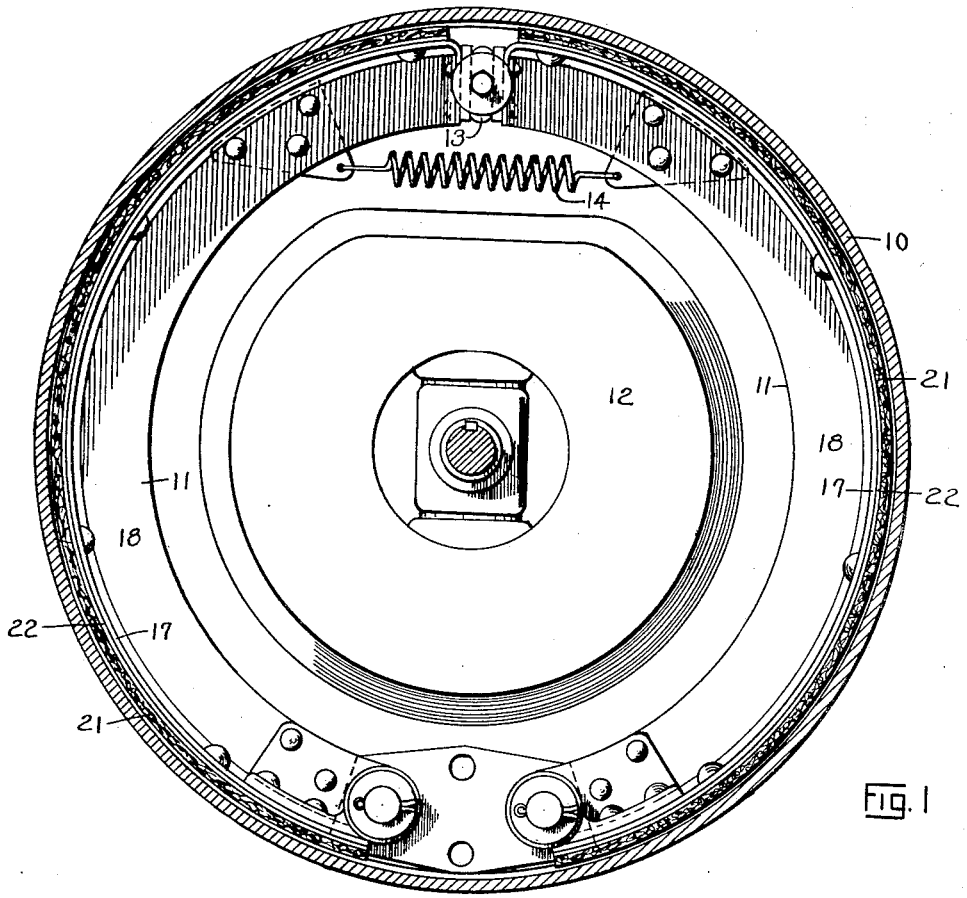

Referring to the accompanying drawing in which like numerals refer to like parts throughout the several views, the brake comprises a rotatable drum 10 and a pair of semi-circular brake shoes 11 pivoted at adjacent ends to a dust cover 12 which closes in the open side of the brake drum 10. The brake shoes 11 are moved into engagement with the brake drum 10 by means of a rotatable cam 13, which is positioned between the adjacent free ends of the same. A coil spring 14 normally holds the brake shoes 11 out of contact with the brake drum 10. The details of cam 13, its operating means, and the pivotal connections for the brake shoes do not form a part of my present invention and are therefore not described in detail, the same being fully described in my co-pending application, Serial No. 247,225 of which this case is a division, and reference may be had to the parent application to these details of construction and operation.

Figure 2:
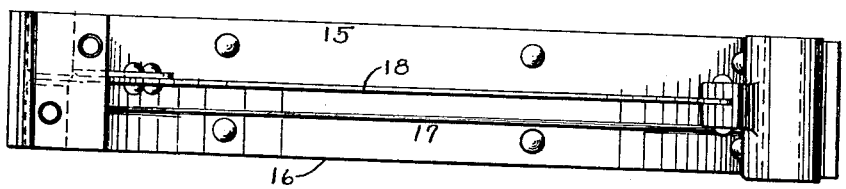
Figure 2 is a plan view of one of the brake shoes shown in Figure 1.
Figure 3:
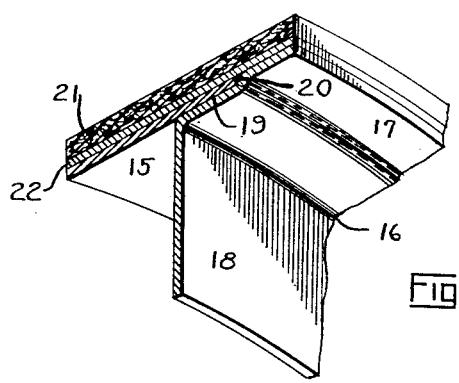
Figure 3 is a fragmentary perspective view of one of the brake shoes showing the cross sectional shape of the same.

Both shoes 11 are identical in construction so therefore, only one of the same will be described in detail. The shoe 11 as shown in Figures 2 and 3 is constructed entirely of pressed metal stampings assembled together to provide a construction which is light in weight, economical to manufacture, and which is very rigid. The shoe comprises two pressed metal members, a strap or band 15 and an arcuate L-shaped angle member 16. The legs of the angle member 16 provide the brake shoe with an axial supporting flange 17 and an integral reinforcing web 18. This angle member 16 may be rolled or stamped to shape and during this operation the axial flange 17 thereof is stepped intermediate its edges so that the portion thereof adjacent to the reinforcing web 18 lies in a plane substantially below the portion adjacent to the opposite marginal edge. That is to say, the angle member 16 is formed with an offset adjacent to the reinforcing web 18 to provide a seat 19 against which a portion of the axial band 15 abuts and is secured thereto by welding or any other suitable means. The step 20 interconnecting the two portions of the axial flange 17 also forms an abutment against which the marginal edge of the axial band 15 seats itself and to which the band 15 may be secured by welding or otherwise.

As shown in Figure 3, the seat 19 is offset from the remainder of the flange 17 an amount equal to the thickness of the band 15 so that when the band 15 is secured to the offset 19 of the angle member, the upper surfaces of the band 15 and the flange 17 will lie in the same axial planes to provide supporting and attaching surfaces for the brake shoe friction facing 21. The friction facing 21 may be secured by any suitable means to the attaching surfaces provided by the band 15 and the flange 17 of the angle member 16, or if desired, a reinforcing and strengthening plate 22 may be secured by welding or any other suitable means to the attaching surfaces just mentioned and the friction facing 21 secured to the plate 22. It is to be understood however, that the plate 22 is merely optional and may or may not be used.

As shown in Figure 3, the reinforcing web 18 is positioned substantially midway between the marginal edges of the brake shoe and the shoe is suitably reinforced adjacent to the web 18 by the double thickness of metal adjacent to the web so that the shoe is made very rigid at points where the greatest stresses occur.

It is evident from the drawing and the foregoing description that a brake shoe is provided which is very economical to manufacture because of the simplicity of the same, it being constructed solely of two parts, namely, an axial band and an angle shaped member which are welded or otherwise secured together. The shoe is light in weight, yet it is very rigid in construction because of its reinforcing web and double thickness of metal adjacent to this web.

It is to be understood however, that formal changes may be made in the specific embodiment of the invention described without departing from the spirit and substance of the broad invention, the scope of which is commensurate with the appended claims.

What I claim is:

1. A brake shoe comprising an arcuate L-shaped member provided with an axial flange having an offset formed therein along one side thereof and a radial reinforcing web, and a second arcuate member received in and secured to said offset portion of said axial flange to effect a continuation thereof and provide a brake friction facing supporting surface.

2. A brake shoe comprising an arcuate member provided with an axial flange having an offset formed therein along one side thereof and a radial reinforcing web, and a second arcuate member supported by said axial flange in abutting relation with said offset, whereby said second arcuate member provides a brake friction facing supporting surface.

3. A brake shoe comprising an axial band and an angle member having an axial flange and a radial reinforcing web, said axial flange being stepped circumferentially thereof to provide a seat for a marginal edge of said band.

4. A brake shoe comprising an axial band and an angle member having an axial flange and a radial web, said axial flange being stepped to form a seat for a marginal edge of said band, and said flange extending beyond the side of and in the plane with said band to effect a continuation thereof thereby to provide a brake friction facing supporting surface.

5. A brake shoe comprising an arcuate band, and an angle member having a radial reinforcing web and an arcuate lining-supporting part provided with an arcuate depression therein extending substantially parallel with said web for receiving a portion of said arcuate band, said band being flush with said lining-supporting part.

6. A brake shoe comprising an axial band, and an arcuate L-shaped member having a depression in the axial part thereof for receiving one side of said band to provide lining-supporting faces, the other part of said member being extended radially inwardly to provide a reinforcing web substantially midway between the free edges of said axial band and axial part of said L-shaped member.

7. A brake shoe comprising two members, namely, an arcuate L-shaped member having an axial flange provided with an offset therein, and an axial band secured in said offset.

8. A brake shoe comprising two members, namely, an arcuate L-shaped member having an axial flange provided with an offset extending circumferentially thereof, and an axial band having one side thereof secured in said offset.

9. A brake shoe comprising an angle member having an axial flange provided with a recess therein extending substantially the full length thereof, and an axial band received in and secured to said recess.

10. A brake shoe having a brake lining supporting part comprising an axial flange and an axial band extending parallel therewith secured to said flange with the outer faces of said flange and band flush with each other.

11. A brake shoe comprising an arcuate angle member provided with an axial flange having an offset in one side thereof, and an arcuate member supported in the offset portion having its outer face substantially flush with the outer face of said flange.

12. A brake shoe comprising an arcuate angle member provided with a radial web and an axial flange having an offset therein spaced from said web, and an arcuate band supported in said offset portion, the outer faces of said band and axial flange being substantially in the same plane.

13. A brake shoe comprising an arcuate band and an angle member having a radial reinforcing web and an arcuate flange provided with an offset therein extending circumferentially thereof, a portion of said band being received in and secured to said offset portion of said member.

14. A brake shoe comprising an arcuate band and an angle member having a radial web and an axial flange provided with an offset extending substantially parallel with said web, a portion of said band being received in and secured to said offset portion to provide said shoe with a double thickness of metal adjacent to said radial web.

15. A brake shoe comprising an arcuate L-shaped member having an axial flange provided with an offset therein extending circumferentially thereof, an axial band secured in said offset having its outer surface flush with the outer surface of the remainder of said axial flange, and a reinforcing band extending across said outer surfaces of said band and axial flange to provide a brake friction facing supporting surface.

16. A two part brake shoe comprising, an arcuate angle member having an axial flange and a radial reinforcing web, said flange being provided with an offset therein, and an axial band extending substantially the length of said flange and secured in said offset, said band providing the sole support for a brake lining on one side of said reinforcing web.

ROBERT F. KOHR.